US011542920B2

(12) United States Patent
Cao van Truong et al.

(10) Patent No.: US 11,542,920 B2
(45) Date of Patent: Jan. 3, 2023

(54) INSULATION OF A HEATING MAT OF A WIND TURBINE BLADE

(71) Applicant: Siemens Gamesa Renewable Energy A/S, Brande (DK)

(72) Inventors: Yannick Cao van Truong, Aalborg (DK); Nikolai Bak Grishauge, Nibe (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 186 days.

(21) Appl. No.: 16/615,888

(22) PCT Filed: Mar. 13, 2018

(86) PCT No.: PCT/EP2018/056153
§ 371 (c)(1),
(2) Date: Nov. 22, 2019

(87) PCT Pub. No.: WO2018/219511
PCT Pub. Date: Dec. 6, 2018

(65) Prior Publication Data
US 2020/0080545 A1 Mar. 12, 2020

(30) Foreign Application Priority Data
May 30, 2017 (DE) ...................... 10 2017 209 066.9

(51) Int. Cl.
*F03D 80/40* (2016.01)
*F03D 80/30* (2016.01)
(Continued)

(52) U.S. Cl.
CPC ........... *F03D 80/40* (2016.05); *F03D 1/0675* (2013.01); *F03D 80/30* (2016.05); *H05B 3/145* (2013.01);
(Continued)

(58) Field of Classification Search
None
See application file for complete search history.

(56) References Cited

U.S. PATENT DOCUMENTS 4,010,530 A * 3/1977 Delgrosso ............. F04D 29/324
29/889.71
2005/0189345 A1* 9/2005 Brunner ................. B64D 15/12
219/548

(Continued)

FOREIGN PATENT DOCUMENTS

| CA | 2992633 A1 | 1/2017 |
| CN | 102811908 A | 12/2012 |
| CN | 105952590 A | 9/2016 |

OTHER PUBLICATIONS

European Examination Report for Application No. 18714158.5, dated Sep. 9, 2020.
(Continued)

*Primary Examiner* — Kayla Mccaffrey
(74) *Attorney, Agent, or Firm* — Schmeiser, Olsen & Watts LLP

(57) ABSTRACT

Provided is a rotor blade of a wind turbine including a leading edge section with a leading edge and a trailing edge section with a trailing edge, wherein the leading edge and the trailing edge divide the surface of the rotor blade into a suction side and a pressure side. The rotor blade further includes a blade shell for defining the outer shape of the rotor blade and a heating mat for anti-icing and/or deicing purposes which is arranged upon the blade shell. In the outboard region of the rotor blade, the heating mat is substantially or completely covered by a protective shield made of an electrically insulating polymer material. Use of a protective shield made of electrically insulating polymer
(Continued)

material for electrical insulation of a heating mat in particular, against lightning strikes is also provided.

9 Claims, 5 Drawing Sheets

(51) Int. Cl.
    *F03D 1/06*     (2006.01)
    *H05B 3/14*     (2006.01)
    *H05B 3/18*     (2006.01)

(52) U.S. Cl.
    CPC ........ *H05B 3/18* (2013.01); *F05B 2240/2211* (2013.01); *F05B 2280/2006* (2013.01)

(56) References Cited

U.S. PATENT DOCUMENTS

| | | | |
|---|---|---|---|
| 2008/0099617 A1* | 5/2008 | Gilmore | F03D 80/40 244/134 R |
| 2008/0181775 A1* | 7/2008 | Livingston | F03D 1/0675 416/224 |
| 2011/0142678 A1 | 6/2011 | Santiago et al. | |
| 2012/0298803 A1 | 11/2012 | English et al. | |
| 2013/0022465 A1* | 1/2013 | Stiesdal | F03D 80/40 416/95 |
| 2013/0170992 A1* | 7/2013 | Loewe | F03D 1/0675 416/95 |
| 2013/0195661 A1* | 8/2013 | Lind | F03D 80/40 416/95 |
| 2014/0348654 A1* | 11/2014 | Klein | F03D 80/40 416/95 |
| 2018/0029699 A1* | 2/2018 | Nissen | B64C 27/473 |
| 2018/0209400 A1 | 7/2018 | Drachmann Haag | |

OTHER PUBLICATIONS

Non-English Chinese Office Action for Application No. 201880036039.5, dated Jul. 1, 2020.

International Search Report and Written Opinion of the International Searching Authority dated Jul. 4, 2018 for Application No. PCT/EP2018/05615.

* cited by examiner

INSULATION OF A HEATING MAT OF A WIND TURBINE BLADE

CROSS-REFERENCE TO RELATED APPLICATIONS

This application claims priority to PCT Application No. PCT/EP2018/056153, having a filing date of Mar. 13, 2018, which is based off of DE Application No. 10 2017 209 066.9, having a filing date of May 30, 2017, the entire contents both of which are hereby incorporated by reference.

FIELD OF TECHNOLOGY

The following relates to a rotor blade of a wind turbine. In particular, the following relates to the use of a protective shield for electrically insulating a heating mat of a rotor blade of a wind turbine.

BACKGROUND

Depending on the weather conditions at a specific wind turbine site, icing of the rotor blades of the wind turbine may occur. A rotor blade which is partially or entirely covered with ice is generally undesired by the wind turbine operator for various reasons. First, the aerodynamic efficiency of the rotor blades and, hence, of the wind turbine may be reduced due to the icing. This is due to the fact that the shape and geometry of the rotor blade is carefully optimized and any deviation of the shape, e.g. by an additional layer of ice or by irregularities of the surface, generally impairs the aerodynamic efficiency. Second, a layer of ice on the surface of the rotor blade adds weight to the rotor blade, which, if unevenly distributed over the rotor of the wind turbine, may create imbalances of the rotor. Third, parts of the ice may be thrown from the rotor blades during operation of the wind turbine, i.e. during rotation of the rotor, which may create damages to people and objects being located in the reach of the wind turbine.

In summary, the build-up of ice on a wind turbine blade is avoided. In the case of a blade which is already partly or entirely covered by ice, means to deice the blade are provided.

One approach to avoid the build-up of ice and to eliminate existing ice on the surface of a wind turbine blade is the provision of an electro-thermal system. In this approach, an electrically conductive heating mat is used as an electrical resistance. The heating mat is usually laminated on the outer surface of the rotor blade after the rotor blade has been casted and before the top coat and paint is applied to the blade.

A problem of using heating mats on the surface of the rotor blade is that the heating mats may represent a preferred attachment area for a lightning leader (or streamer). In other words, there is a non-negligible likelihood that a lightning strike hits the heating mat instead of a lightning receptor of the rotor blade and afflicts damage to the rotor blade.

SUMMARY

An aspect relates to a solution to this problem.

According to embodiments of the invention, there is provided a rotor blade of a wind turbine comprising a leading-edge section with a leading edge and a trailing edge section with a trailing edge, wherein the leading edge and the trailing edge divide the surface of the rotor blade into a suction side and a pressure side. The rotor blade further comprises a blade shell for defining the outer shape of the rotor blade, and a heating mat for anti-icing and/or deicing purposes which is arranged upon the blade shell. Furthermore, the rotor blade is characterized in that in the outboard region of the rotor blade, the heating mat is substantially or completely covered by a protective shield made of an electrically non-conductive polymer material.

Particularly, the outboard region of the rotor blade is defined by the outmost fifteen per cent of the rotor blade in spanwise direction. The spanwise direction of the rotor blade is defined as the direction of a straight line which extends from the root to the tip of the rotor blade.

The protective shield is made of an electrically non-conductive polymer material. The protective shield is destined for protection of at least a part of the leading-edge section against erosion. Therefore, the protective shield is also referred to as a "leading edge protection" (LEP) shield. The LEP shield is also known as a LEP shell. Depending on the design of the protective shield, the shield may either be referred to as a "hard shell" or as a "soft shell". A soft shell features a certain flexibility and may cling to the contour of the surface of the rotor blade.

A key aspect of embodiments of the present invention is that a protective shield, which is primarily known for protecting the leading-edge section of a rotor blade of a wind turbine against erosion, is taken and modified in order to insulate a heating mat of the rotor blade against lightning strikes.

In one embodiment of the invention, at least ninety per cent, in particular at least nine-five per cent, even more particularly at least ninety-nine per cent of the heating mat in the outboard region of the rotor blade is covered by the protective shield.

In other words, the main part or the entire area where the heating mat is exposed to lighting strikes is insulated by the electrically non-conductive shield. A high degree of coverage is necessary as otherwise the lightning strike may just hit the heating mat in those areas which are uncovered by the insulating protective shield and may cause the damages to the blade shell there.

Exemplarily, the heating mat comprises carbon. Carbon has been proven to be a well-suited material for a heating mat of a rotor blade of a wind turbine.

Typically, the heating mat does not extend until the very tip of the rotor blade. One reason therefore is that the chord lengths of a rotor blade decrease considerably at the tip section of the rotor blade. As for production and manufacturing reasons, it may be cost efficient to provide the heating mat in one distinct width, i.e. in one distinct chordwise extension when mounted to the rotor blade, the heating mat may only be applied until the last 1-2 meter of the rotor blade, as seen in spanwise direction.

However, the spanwise extension of the heating mat in the outboard region of the rotor blade is greater than five per cent, in particular greater than seven per cent of the length of the rotor blade.

As the outboard region of the rotor blade is defined by the outmost fifteen per cent of the rotor blade in spanwise direction, this means that at least one third, approximately half of the outboard region of the rotor blade are covered by the heating mat.

Such a spanwise extension of the heating mat in the outboard region is advisable as icing of the rotor blade occurs particularly in the outboard region of the rotor blade due to, inter alia, the high circumferential velocity of the rotor blade in that section.

The rotor blade comprises a lightning protection system with at least one lightning receptor in the outboard region of the rotor blade.

In an embodiment of the invention, the heating mat is placed adjacent to the lightning receptor. In other words, the heating mat "encircles" or "surrounds" the lightning receptor, as seen in a top view onto the surface of the rotor blade.

Advantageously, the electrical insulation of the heating mat is sufficiently good that lightning strikes attach at the lightning receptor of the lightning protection system and not at the heating mat.

In the following, three concrete embodiments of protective shields are disclosed. Obviously, these embodiments represent examples only and are not to be construed to limit the scope of protection claimed by this patent application.

In a first embodiment of the invention, the protective shield comprises a curved unit which covers at least partially the leading edge of the rotor blade. Furthermore, the protective shield comprises a first panel which is substantially flat and arranged at the suction side of the rotor blade adjacent to a first rim of the curved unit, and a second panel which is substantially flat and arranged at the pressure side of the rotor blade adjacent to a second rim of the curved unit. The curved unit, the first panel and the second panel are configured as separate pieces.

In other words, a known protective shield such as leading-edge protection shell is supplemented with a first and a second panel. Advantageously, the first and second panel is made of the same or a similar material as the protective shield. The advantage herein is that the way of manufacturing the panels and its properties are known.

Advantageously, the first and second panel substantially or completely cover the heating mat, at least in the outboard region of the rotor blade. The supplement of the first and second panel is advantageous compared to the provision of the protective shield alone, as thus the area of the heating mat which is insulated, i.e. covered by a non-conductive material, may be reduced.

In a second embodiment of the invention, the curved unit covers, in the outboard region of the rotor blade, substantially or completely the heating mat.

In other words, a known protective shield such as leading-edge protection shell is extended over the substantial or complete surface of the heating mat. Thus, the area of the heating mat which is uncovered by an insulating material is significantly reduced, if not avoided at all.

An advantage of providing one single protective shield of which the area extended is that no joints between the shield and any flat panels are needed. Any joints between the shield and adjacent panels could be critical for both leading edge erosion (if the joint is close to the leading edge) and for lightning (as the lightning will target the weakest spot, i.e. the region with discontinuities or reduced thickness, at the surface of the rotor blade).

In a third embodiment of the invention, the rotor blade comprises a further protective shield, and wherein the further protective shield is arranged on top of at least a part of the protective shield.

The protective shield, which is between the surface of the rotor blade and the further protective shield is advantageously extended such that it substantially or completely covers the heating mat in the outboard region of the rotor blade. It can, however, in principle also be divided into a central piece and a first and second substantially flat panel, respectively.

In a variant, the thickness of the further protective shield is reduced in the area where the further protective shield overlaps with the protective shield. Also, the thickness of the protective shield may be decreased in that area. As a result, the combined thickness of the protective shield and the further protective shield may be designed to be substantially constant and equal compared to the thickness of the protective shield alone, wherein no further protective shield is placed upon the protective shield.

Advantageously, the further protective shield covers at least a part of the leading edge of the rotor blade.

Embodiments of the invention are also directed towards the use of a protective shield made of electrically insulating polymer material for electrical insulation of a heating mat, in particular against lightning strikes, wherein the protective shield is destined for protection of at least a part of the leading edge section against erosion, the heating mat is arranged upon a blade shell of a rotor blade of a wind turbine and is destined for anti-icing and/or deicing purposes, and in the outboard region of the rotor blade, the heating mat is substantially or completely covered by the protective shield.

BRIEF DESCRIPTION

Some of the embodiments will be described in detail, with reference to the following figures, wherein like designations denote like members, wherein.

Note that the drawings are in schematic form. Furthermore, similar or identical elements may be referenced by the same reference signs.

DETAILED DESCRIPTION

Figure 1:
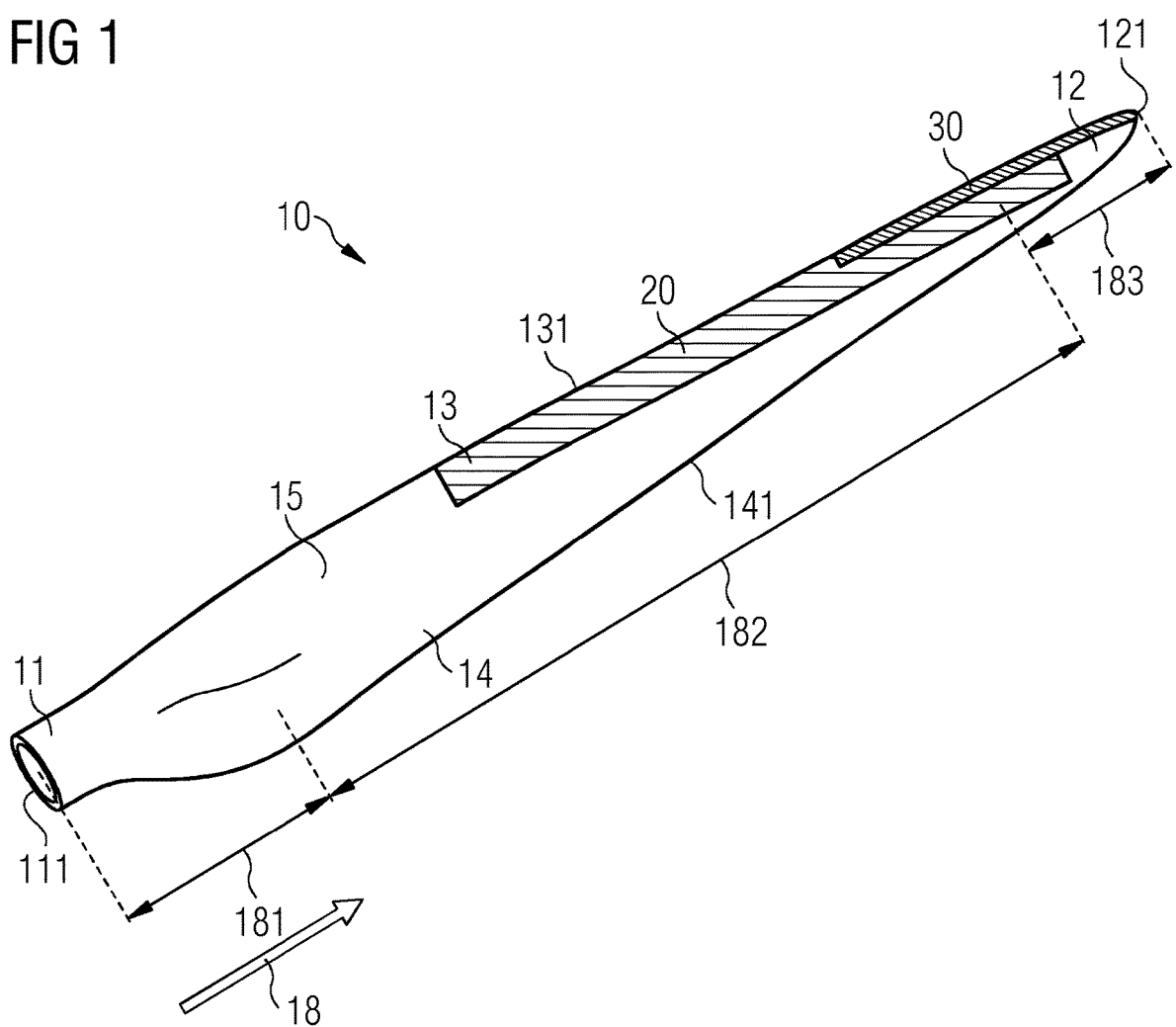
FIG. 1 shows a perspective view of a known rotor blade of a wind turbine.

FIG. 1 shows a perspective view of a known rotor blade 10 of a wind turbine. The rotor blade 10 comprises a root section 11 with a root 111 and, at its opposite end, a tip section 12 with a tip 121. The spanwise direction 18 of the rotor blade 10 is defined as the direction of a straight line extending from the root 111 to the tip 121 of the rotor blade 10. The rotor blade 10 further comprises a leading-edge section 13 with a leading edge 131 and a trailing edge section 14 with a trailing edge 141. The leading edge 131 and the trailing edge 141 divide the surface of the rotor blade 10 into a suction side 15 and a pressure side 16. FIG. 1 shows a view onto the suction side 15 of the rotor blade 10.

The trailing edge section 14 is defined as that section which is adjacent to the trailing edge 141 and extends until ten percent in chordwise direction. Likewise, the leading-edge section 13 extends until ten percent in chordwise extension away from the leading edge 131.

The rotor blade 10 is constructed with a blade shell 17 which surrounds and defines a cavity inside. The cavity which can be understood as the hollow inside area of the rotor blade 10 has the function that material and weight of the rotor blade is minimized.

The rotor blade 10 is divided into an inboard region 181, a mid-board region, and an outboard region 183. The inboard region 181 is defined as the inner most fifteen percent of the blade length, the mid-board 182 region is defined as the seventy percent of the blade length which is located between the inboard region 181 and the outboard region 183. Consequently, the outboard region 183 is defined as the outer most fifteen percent of the blade length. The wording "inner most" and "outer most" relate to the situation that the rotor blade 10 is mounted and attached to a hub of a wind turbine. Then, during rotation of the rotor of the wind turbine the rotor blade travels across a swept area wherein the circumferential velocity of the tip, and generally of the outboard region 183, is highest.

The rotor blade 10 as illustrated in FIG. 1 also comprises a heating mat 20 for preventing the build-up of ice on the surface of the rotor blade 10. Another purpose of the heating mat 20 is to melt, i.e. to eliminate, already existing ice on the rotor blade 10. The heating mat 20 extends along the major part of the outboard region 183 and the major part of the mid-board region 182 of the rotor blade 10. Note that the extension of the heating mat 20 in chordwise direction, i.e. its width, is substantially constant along its lengthwise extension. This leads to the situation that the heating mat 20 does not extend until the very tip 121 of the rotor blade 10 but finishes a few meters before. The heating mat is not covering the leading-edge section 13 in the inboard region 181 of the rotor blade 10 because the build-up of ice in the inboard region 181 is less likely than in the outboard region 183 of the rotor blade 10.

The rotor blade 10 also comprises a protective shield 30 for protecting the leading edge 131 of the rotor blade 10 against erosion. Erosion typically occurs due to small particles of dust and dirt and may also occur due to insects. Over the years and under harsh conditions, the leading edge 131 and adjacent areas around the leading edge 131 are typically damaged. This generally decreases the aerodynamic efficiency of the rotor blade 10. Therefore, provision of a protective shield 30, such as a leading-edge protection soft shell or leading edge protection hard shell is recommendable. Such a protective shield 30 can either be retrofitted on an already operating wind turbine or can be provided on a newly manufactured rotor blade. Note, that in the example of FIG. 1, the protective shield extends over the complete outboard region 183, but only extends over a relatively small part of the leading-edge section 131. This is due to the fact that leading edge erosion mainly occurs at the leading edge 131 and in close vicinity to the leading edge 131.

Figure 2:
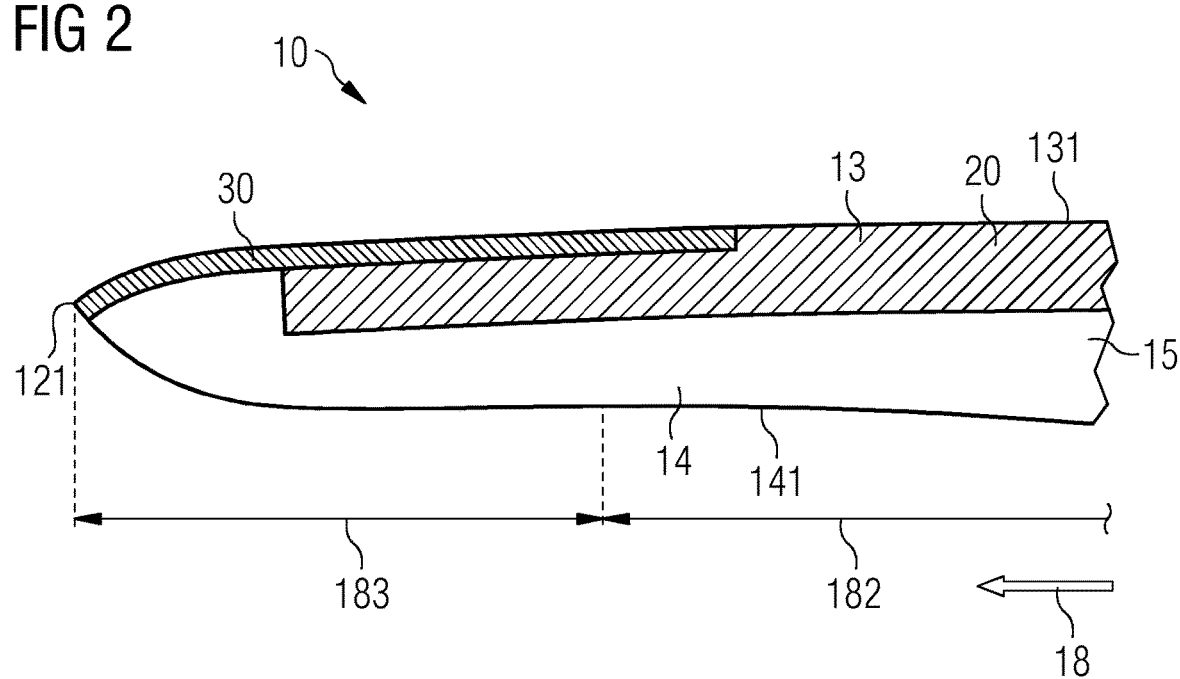
FIG. 2 shows a top view onto a part of the suction side of the known rotor blade of FIG. 1.

FIG. 2 shows a top view onto a part of the suction side 15 of the known rotor blade as illustrated in FIG. 1. Here, it can be seen that the heating mat 20 does not extend until the tip 121 of the rotor blade 10, while the protective shield 30 covers and protects the tip 121 of the rotor blade 10.

Figure 3:
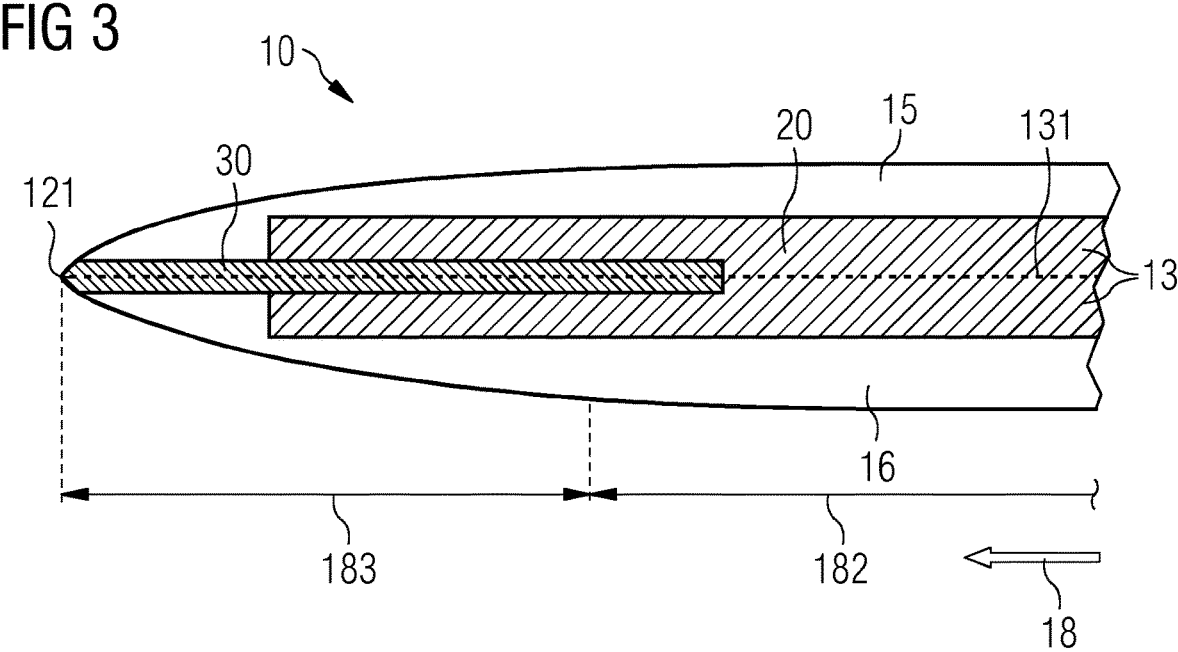
FIG. 3 shows a top view onto a part of the leading edge of the known rotor blade of FIG. 1.

Finally, FIG. 3 shows another view of the same rotor blade, namely a top view onto a part of the leading edge 131 of the rotor blade 10. In FIG. 3, it can be seen that both, the heating mat 20 and the protective shield 30, extend symmetrically around the leading edge 131.

Figure 4:
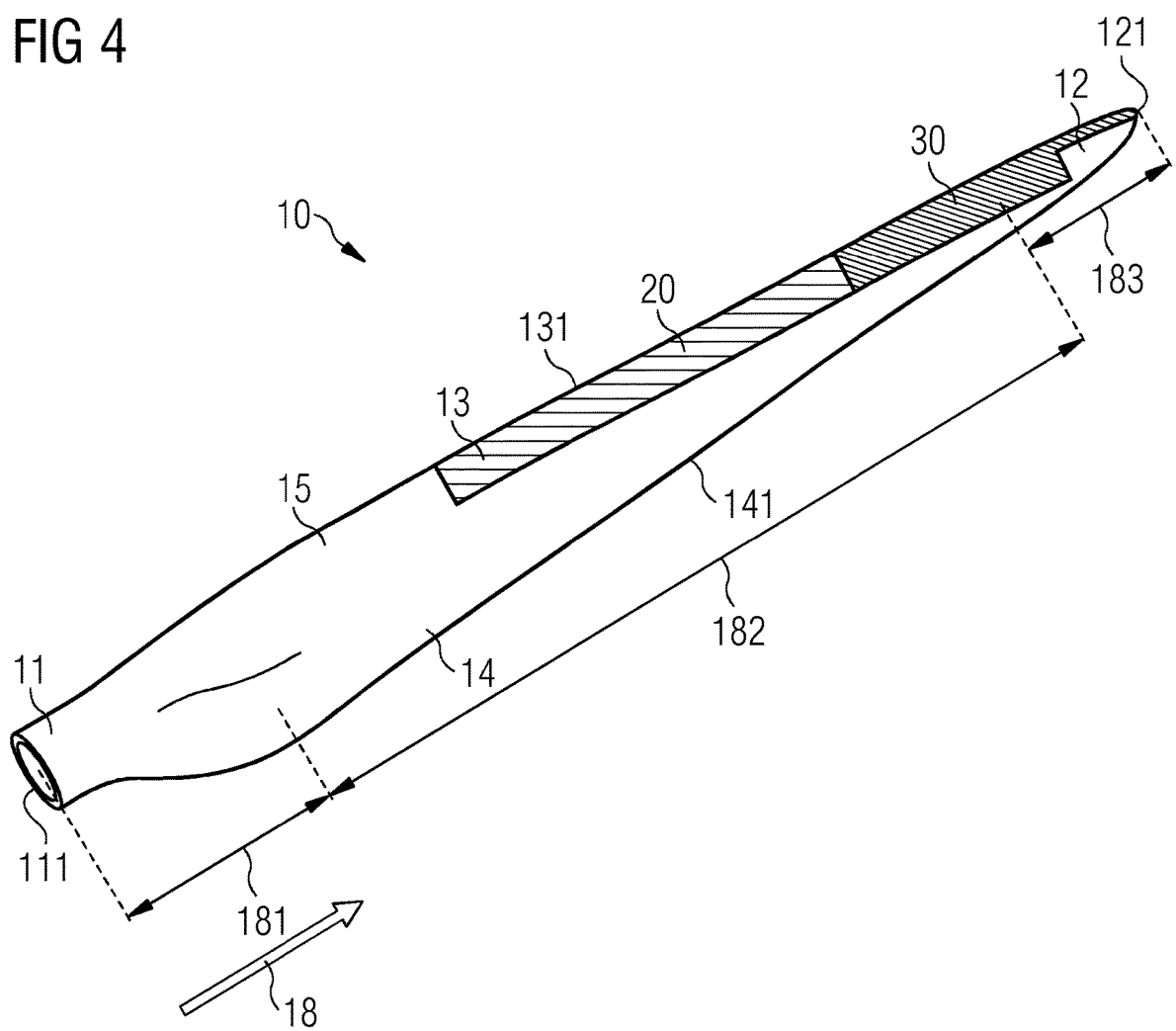
FIG. 4 shows a perspective view of an inventive rotor blade of a wind turbine.

FIG. 4 shows a perspective view of an inventive rotor blade 10 of a wind turbine. The rotor blade 10 as shown in FIG. 4 is similar to the rotor blade 10 as shown in FIGS. 1 to 3. However, this time, the protective shield 30 is designed differently. The main difference between the protective shield 30 of the rotor blade as illustrated in FIG. 4 compared to the protective shield 30 as illustrated in the FIGS. 1 to 3 is that the protective shield 30 now covers the entire chordwise extension of the heating mat 20 in the region where the protective shield against erosion of the leading edge 131 is provided for. The chordwise extension of the protective shield 30 is still relatively small in the tip section 12 of the rotor blade 10 as in the tip section 12 of the rotor blade 10 there is not provided any heating mat. However, at that point where the heating mat 20 is arranged, the protective shield 30 ensures that it covers the surface of the heating mat 20 such that the heating mat 20 is electrically insulated and is not attracting lightning strikes. Thus, lightning only strikes and attaches in the lightning receptors and corresponding elements of the lightning protection system of the rotor blade.

Figure 5:
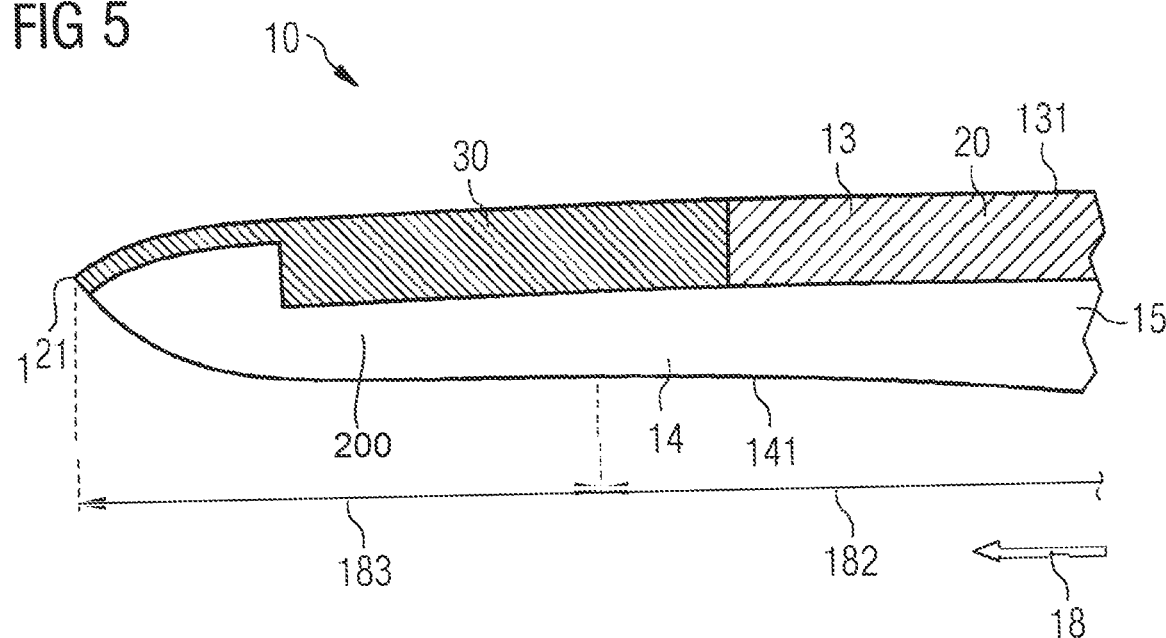
FIG. 5 shows a top view onto a part of the suction side of the inventive rotor blade of FIG. 4.
Figure 6:
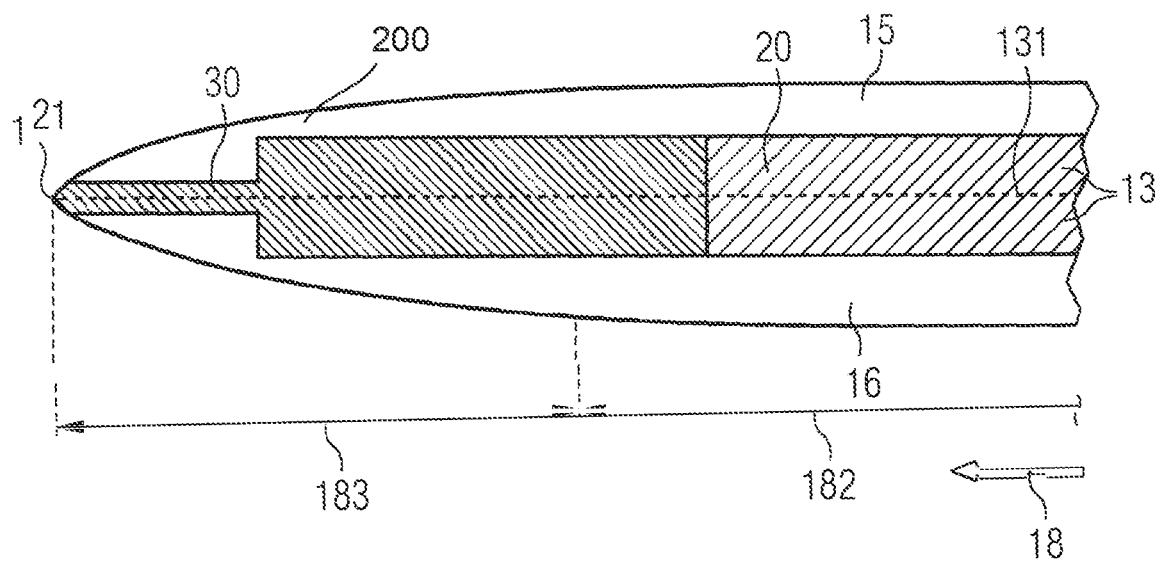
FIG. 6 shows a top view onto a part of the leading edge of the inventive rotor blade of FIG. 4.

FIGS. 5 and 6 show similar views on the rotor blade 10 compared to FIGS. 2 and 3. Here again, it can be seen how the protective shield 30 effectively covers the surface of the heating mat 20 in the entire outboard region 183 and in parts of the mid-board region 182 of the rotor blade 10. This effectively minimizes the risk of damages to the blade shell laminate of the rotor blade in the section of the rotor blade which is most sensible and most probable to be hit and damaged by lightning strikes not attaching to the lightning receptors of the lightning protection system such as lightning receptor 200.

Figure 7:
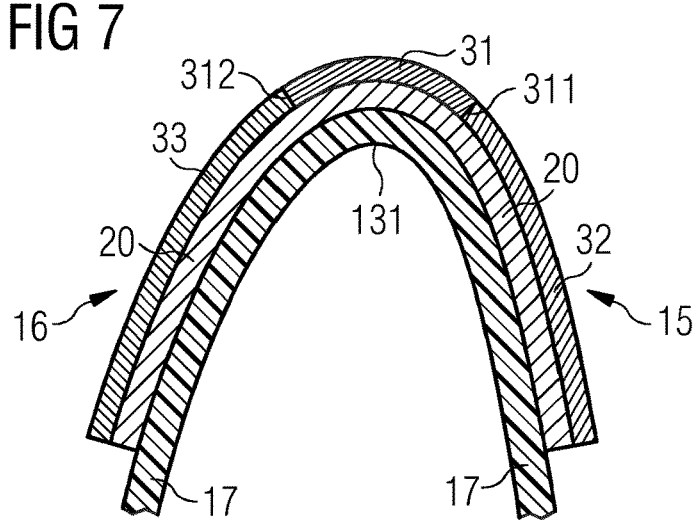
FIG. 7 shows a cross sectional view of a first embodiment of the invention.

FIG. 7 shows a first concrete embodiment of the invention. A cross-sectional view of the rotor blade in the outboard region of the rotor blade is shown. Only the leading-edge section 13 and adjacent parts of the suction side 15 and the pressure side 16 are shown in FIG. 7. First, the blade shell 17 of the rotor blade 10 can be discerned. The blade shell 17 is designed as a laminate comprising a fiber reinforced plastic material attached to balsa wood. The thickness of the blade shell 17 varies and is typically thinnest in the leading-edge section 13 and at the leading edge 131. In contrast, it becomes typically thicker towards the mainboard or main chordwise area of the blade shell 17. This is due to the fact that in the mainboard part the spar caps and the beam (or: web) of the rotor blade naturally and typically are arranged. Here, the structural loads are often times highest and, thus, the blade shell 17 is designed thicker.

On top of the blade shell 17, there is provided the heating mat 20 which is covering the leading edge 131 and a considerable part from the leading edge 131 towards the suction side 15 and towards the pressure side 16. As the heating mat 20 is in principle electrically conductive, the heating mat 20 is in the example of FIG. 7 fully covered by a protective shield which comprises a curved unit 31 with a first rim 311 and a second rim 312, and a first panel 32 and a second panel 33. The first panel 32 is relatively flat and arranged adjacent to the first rim 311 of the curved unit 31. Likewise, the second panel 33 is also relatively flat and is arranged at the second rim 312 of the curved unit 31. The joints at the first rim 311 and the second rim 312 needs to be designed and constructed with utmost care in order to avoid any aerodynamic losses at the joints.

An advantage of providing three separate pieces, namely the curved unit 31, the first panel 32 and the second panel 33, is that first the curved unit 31 can be designed as a conventional hard shell or soft shell for LEP (leading edge protection). Secondly, the segmentation into three separate pieces has the advantage that the pieces can be handled easier, in particular if the mounting of the protective shield 30 takes place on site without dismounting the rotor blade. Such a mounting is known as a retro-fit of the rotor blade or the entire wind turbine.

Figure 8:
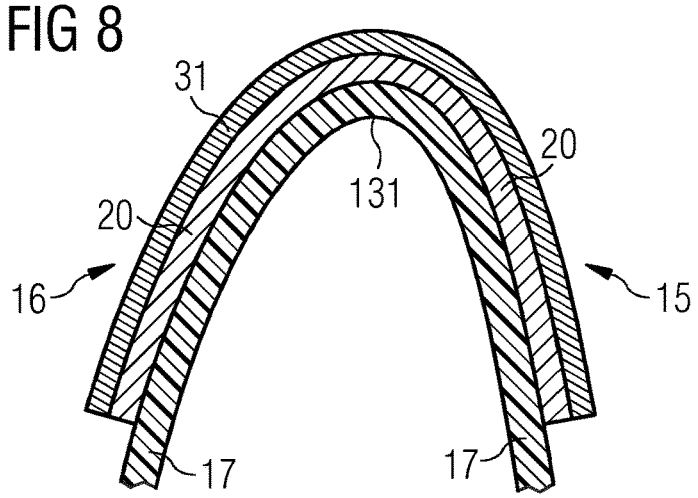
FIG. 8 shows a cross sectional view of a second embodiment of the invention.

FIG. 8 shows a second embodiment of the invention. Again, a cross-sectional view of a part of the leading-edge section 13 with the leading edge 131 and a part of the suction side 15 and the pressure side 16 of the rotor blade is illustrated. Again, a heating mat 20 is arranged upon the blade shell 17. The heating mat 20, as it is electrically conductive and thus, prone to lightning strikes, is in this embodiment fully covered by one single piece, namely, a curved unit 31. The curved unit 31 is not only extending over the leading-edge section 13 but also extending substantially on the pressure side 16 and the suction side 15, namely extending over the entire extension of the heating mat 20.

This has the advantage that no joints need to be connected. However, the challenge is that the piece can be become relatively large, depending on the size of the rotor blade and the size of the heating mat at this section of the rotor blade. Also note, that in general the heating mat and, in particular the protective shield, can well be segmented into individual segments, each segment comprising a length of, for example, one to ten meters.

Figure 9:
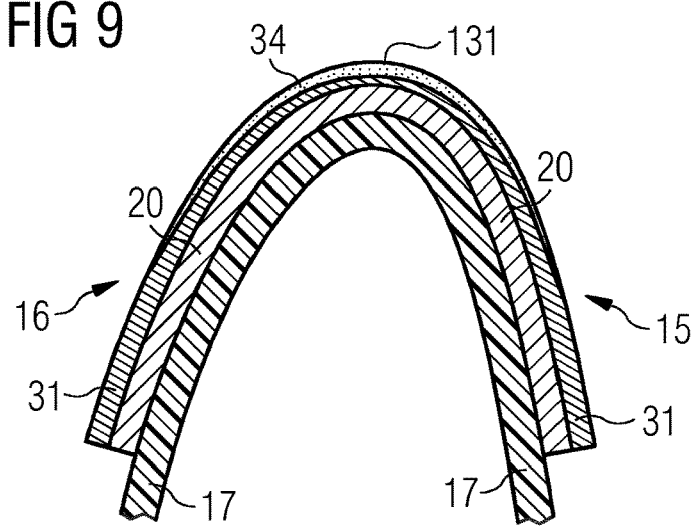
FIG. 9 shows a cross sectional view of a third embodiment of the invention.

Finally, FIG. 9 shows a third concrete embodiment of the invention. This third embodiment resembles the second embodiment, but it has additionally a further protective shield 34 which covers the leading section 13 of the rotor blade. This has the advantage of further protection again electrical conductivity, i.e. against lightning strikes and also against erosion. For example, the further protective shield 34 could be designed similar to conventional leading-edge protection shells (soft shells or hard shells).

Advantageously, the thickness of the further protective shield 34 is thinner and the thickness of the curved unit 31 is thinner at that section where both, the further protective shield 34 and the curved unit 31 overlap. This has the effect that the total or combined thickness is relatively constant, i.e. equal, across the whole are which is covered by the heating mat 20. Thus, negative aerodynamic effects are minimized or completely avoided.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A rotor blade of a wind turbine comprising a leading edge section with a leading edge and a trailing edge section with a trailing edge, wherein the leading edge and the trailing edge divide the surface of the rotor blade into a suction side and a pressure side, wherein the rotor blade further comprises a blade shell for defining the outer shape of the rotor blade, and a heating mat for at least one of an anti-icing and deicing purposes which is arranged upon the blade shell,
wherein
in an outboard region of the rotor blade, the heating mat is one of substantially or completely covered by a protective shield made of an electrically non-conductive polymer material,
wherein the protective shield comprises a curved unit which covers at least partially the leading edge of the rotor blade,
wherein the curved unit covers, in the outboard region of the rotor blade, substantially or completely the heating mat,
wherein the rotor blade comprises a further protective shield, wherein the further protective shield is arranged on top of at least part of the protective shield, and
wherein a curved unit end of the curved unit extends past a heating mat end of the heating mat towards a blade tip of the blade.

2. The rotor blade according to claim 1,
wherein the outboard region of the rotor blade is defined by the outmost fifteen per-cent of the rotor blade in spanwise direction.

3. The rotor blade according to claim 1,
wherein one of at least ninety per-cent, at least ninety-five per-cent, and at least ninety-nine per-cent of the heating mat in the outboard region of the rotor blade is covered by the protective shield.

4. The rotor blade according to claim 1,
wherein the heating mat comprises carbon.

5. The rotor blade according to claim 1,
wherein the spanwise extension of the heating mat in the outboard region of the rotor blade is one of greater than five per cent, and greater than seven per cent of the length of the rotor blade.

6. The rotor blade according to claim 1,
wherein the rotor blade comprises a lightning protection system with at least one lightning receptor in the outboard region of the rotor blade.

7. The rotor blade according to claim 6,
wherein the heating mat is adjacent to the lightning receptor.

8. The rotor blade according to claim 1,
wherein the further protective shield covers at least a part of the leading edge of the rotor blade.

9. A rotor blade of a wind turbine comprising a leading edge section with a leading edge and a trailing edge section with a trailing edge, wherein the leading edge and the trailing edge divide the surface of the rotor blade into a suction side and a pressure side, wherein the rotor blade further comprises a blade shell for defining the outer shape of the rotor blade, and a heating mat for at least one of an anti-icing and deicing purposes which is arranged upon the blade shell,
wherein in an outboard region of the rotor blade, the heating mat is one of substantially or completely covered by a protective shield made of an electrically non-conductive polymer material,
wherein the protective shield comprises a curved unit which covers at least partially the leading edge of the rotor blade, and
wherein the protective shield further comprises
a first panel which is substantially flat and arranged at the suction side of the rotor blade adjacent to a first rim of the curved unit, and
a second panel which is substantially flat and arranged at the pressure side of the rotor blade adjacent to a second rim of the curved unit,
wherein
the curved unit, the first panel and the second panel are configured as separate pieces, and
wherein the rotor blade comprises a further protective shield, wherein the further protective shield is arranged on top of at least part of the protective shield.

* * * * *